(12) United States Patent
Wang et al.

(10) Patent No.: US 10,338,707 B2
(45) Date of Patent: Jul. 2, 2019

(54) INTEGRATED FRONT LIGHT ASSEMBLY, MANUFACTURING METHOD THEREOF, AND REFLECTIVE DISPLAY DEVICE

(71) Applicant: BOE Technology Group Co., Ltd., Beijing (CN)

(72) Inventors: Long Wang, Beijing (CN); Guangkui Qin, Beijing (CN); Fangzhen Zhang, Beijing (CN); Xiaoling Xu, Beijing (CN); Chun Wei Wu, Beijing (CN); Yanfeng Wang, Beijing (CN); Li Zhou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/310,179

(22) PCT Filed: Nov. 27, 2015

(86) PCT No.: PCT/CN2015/095772
§ 371 (c)(1),
(2) Date: Nov. 10, 2016

(87) PCT Pub. No.: WO2016/188071
PCT Pub. Date: Dec. 1, 2016

(65) Prior Publication Data
US 2017/0262088 A1 Sep. 14, 2017

(30) Foreign Application Priority Data
May 26, 2015 (CN) .......................... 2015 1 0276633

(51) Int. Cl.
G06F 3/041 (2006.01)
F21V 8/00 (2006.01)
G06F 3/044 (2006.01)

(52) U.S. Cl.
CPC ........... *G06F 3/041* (2013.01); *G02B 6/0055* (2013.01); *G02B 6/0061* (2013.01);
(Continued)

(58) Field of Classification Search
CPC ........... G06F 3/041; G06F 2203/04103; G02B 6/0055; G02B 6/0061; G02B 6/0065
(Continued)

(56) References Cited

U.S. PATENT DOCUMENTS

2002/0101399 A1  8/2002  Kubo et al.
2007/0223250 A1* 9/2007  Chen .................... G02B 6/0036
                                                       362/614
(Continued)

FOREIGN PATENT DOCUMENTS

CN          1256698 C      5/2006
CN        101738659 A      6/2010
(Continued)

OTHER PUBLICATIONS

Mar. 7, 2016—(WO) International Search Report and Written Opinion Appn PCT/CN2015/095772 with English Tran.
(Continued)

*Primary Examiner* — Mark W Regn
(74) *Attorney, Agent, or Firm* — Banner & Witcoff, Ltd.

(57) ABSTRACT

An integrated front light assembly, a manufacturing method thereof and a reflective display device are disclosed. The integrated front light assembly includes a protective substrate; a touch-control layer disposed on the protective substrate; a light guide layer disposed on the touch-control layer; and a light source disposed on at least one side of the light guide layer. The reflective display device comprises a display panel and the integrated front light assembly. In this way, a thickness of the reflective display device can be reduced and a display effect of the reflective display device can be improved.

12 Claims, 8 Drawing Sheets

(52) U.S. Cl.
CPC ........... *G02B 6/0065* (2013.01); *G06F 3/044* (2013.01); *G06F 2203/04103* (2013.01)

(58) Field of Classification Search
USPC .......................................................... 345/173
See application file for complete search history.

(56) References Cited

U.S. PATENT DOCUMENTS

| | | | |
|---|---|---|---|
| 2010/0101127 A1 | 4/2010 | Chen | |
| 2013/0301196 A1* | 11/2013 | Miyazaki | H05K 7/02 361/679.01 |
| 2014/0354601 A1* | 12/2014 | Bita | G02B 6/0055 345/175 |

FOREIGN PATENT DOCUMENTS

| | | |
|---|---|---|
| CN | 102696006 A | 9/2012 |
| CN | 204009308 U | 12/2014 |
| CN | 104571658 A | 4/2015 |
| CN | 104808391 A | 7/2015 |
| TW | 243262 B | 11/2005 |

OTHER PUBLICATIONS

Apr. 1, 2017—(CN) First Office Action Appn 201510276633.X with English Tran.

* cited by examiner

INTEGRATED FRONT LIGHT ASSEMBLY, MANUFACTURING METHOD THEREOF, AND REFLECTIVE DISPLAY DEVICE

The application is a U.S. National Phase Entry of International Application No. PCT/CN2015/095772 filed on Nov. 27, 2015, designating the United States of America and claiming priority to Chinese Patent Application No. 201510276633.X filed with the SIPO on May 26, 2015. The present application claims priority to and the benefit of the above-identified applications and the above-identified applications are incorporated by reference herein in their entirety.

TECHNICAL FIELD

Embodiments of the present invention relate to an integrated front light assembly, a manufacturing method thereof and a reflective display device.

BACKGROUND

With continuous development of display technology, various display devices emerge in an endless stream, in which, particularly, reflective display devices have attained more and more concerns. The reflective display device may display in virtue of light from external environment. In an environment with poor light, a front light source has to be additionally arranged to assist the reflective display device with achieving display function.

In general, to ensure good display effect, a front light source may be additionally arranged to assist the reflective display device with achieving display function. A manufacturing process of the commonly used reflective display device with touch-control function includes: forming a front light source above a display panel, in which the front light includes a light-guide plate and a light-emitting diode (LED); forming touch units above the front light source; and finally, forming a protective substrate above the touch units. The front light source, the touch units and the protective substrate are all bonded to each other by using a bonding agent.

SUMMARY

Embodiments of the present invention provide an integrated front light assembly, a manufacturing method thereof and a reflective display device, which can reduce a thickness of the reflective display device and improve a display effect of the reflective display device.

The integrated front light assembly provided by the present invention includes: a protective substrate; a touch-control layer disposed on the protective substrate; a light guide layer disposed on the touch-control layer; and a light source disposed on at least one side of the light guide layer.

In one example, the integrated front light assembly further includes: a first insulating layer disposed between the protective substrate and the touch-control layer.

In one example, the touch-control layer includes: a first touch sensing layer disposed on the first insulating layer; and a second insulating layer disposed on the first touch sensing layer.

In one example, the integrated front light assembly further includes: plural optical re-directional structures disposed between the second insulating layer and the light guide layer.

In one example, each of the optical re-directional structures includes: a first reflective pattern disposed on the second insulating layer; and a second reflective pattern disposed on the first reflective pattern, wherein a reflectivity of the first reflective pattern is smaller than that of the second reflective pattern.

In one example, each of the optical re-directional structures has a shape of any one of cuboid, quadrangular frustum pyramid and hemispheroid.

In one example, the plural optical re-directional structures are arranged in plural optical re-directional structure columns; each of the optical re-directional structure columns includes plural optical re-directional structures; and the optical re-directional structures of any two adjacent optical re-directional structure columns are arranged in staggered manner.

In one example, the first touch sensing layer includes a touch sensing electrode and a touch drive electrode; and the touch-control layer further includes a bridge metal layer disposed on the second insulating layer; wherein the bridge metal layer is connected with the touch sensing electrode through a via hole in the second insulating layer, or the bridge metal layer is connected with the touch drive electrode through a via hole in the second insulating layer.

In one example, the first touch sensing layer is a touch sensing electrode or a touch drive electrode.

In one example, the touch-control layer further includes: a second touch sensing layer disposed on the second insulating layer, wherein the first touch sensing layer is a touch sensing electrode, and the second sensing layer is a touch drive electrode; or, the first touch sensing layer is a touch drive electrode, and the second sensing layer is a touch sensing electrode.

In one example, the integrated front light assembly further includes: a touch-control module disposed on the protective substrate, at one side of the first insulating layer.

A reflective display device provided by the present invention includes: a display panel; and any integrated front light assembly above, wherein the light guide layer in the integrated front light assembly is bonded to the display panel by using a bonding agent.

A manufacturing method of an integrated front light assembly provided by the present invention includes: disposing a touch-control layer on a protective substrate; disposing a light guide layer on the touch-control layer; and disposing a light source on at least one side of the light guide layer.

In one example, the manufacturing method further includes: disposing a first insulating layer between the protective substrate and the touch-control layer.

In one example, disposing a touch-control layer on a protective substrate includes: disposing a first touch sensing layer on the first insulating layer; and disposing a second insulating layer on the first touch sensing layer.

In one example, the manufacturing method further includes: disposing plural optical re-directional structures between the second insulating layer and the light guide layer.

In one example, disposing plural optical re-directional structures between the second insulating layer and the light guide layer includes: disposing a first reflective layer on the second insulating layer, the first reflective layer includes plural first reflective patterns; and forming a second reflective layer on the first reflective layer, the second reflective layer includes plural second reflective patterns corresponding to the first reflective patterns respectively, wherein a reflectivity of the first reflective layer is smaller than that of the second reflective layer.

In one example, the first touch sensing layer includes a touch sensing electrode and a touch drive electrode; and the manufacturing method further includes: disposing a bridge metal layer on the second insulating layer, wherein the bridge metal layer is connected with the touch sensing electrode through a via hole in the second insulating layer; or the bridge metal layer is connected with the touch drive electrode through a via hole in the second insulating layer.

In one example, the first touch sensing layer is a touch sensing electrode or a touch drive electrode.

In one example, the manufacturing method further includes: disposing a second touch sensing layer on the second insulating layer, wherein the first touch sensing layer is a touch sensing electrode, and the second touch sensing layer is a touch drive electrode; or, the first touch sensing layer is a touch drive electrode, and the second touch sensing layer is a touch sensing electrode.

BRIEF DESCRIPTION OF THE DRAWINGS

Hereafter, the embodiments of the present invention will be described in detail with reference to the drawings, so as to make one person skilled in the art understand the present invention more clearly.

DETAILED DESCRIPTION

Figure 1:
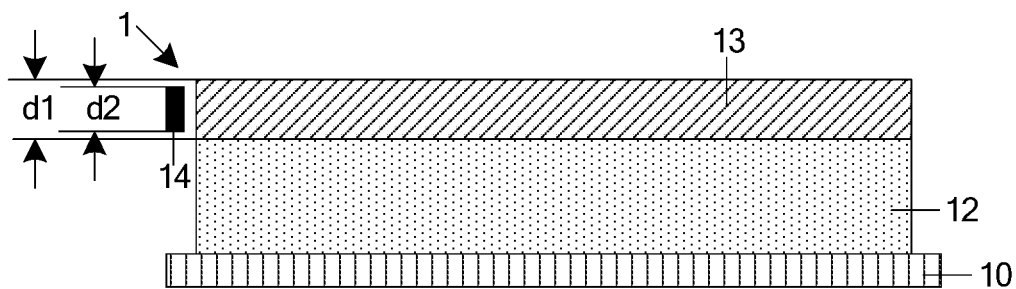
FIG. 1 is a schematic structural view I of an integrated front light assembly provided by the embodiment of the present invention.

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at least one. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not intended to define a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

The drawings to which the embodiments of the present invention refer are merely illustrative in order to explain the technical solutions of the present invention. Variations and modifications may be made conveniently to these drawings, which are all fallen within the scope of protection of the present invention.

As used herein, the term "layer" in the embodiment of the present invention may be obtained by coating a certain material; or may be obtained through forming a film by coating a certain material and then forming at least one pattern on the film. For instance, a corresponding patterning process may be selected for the "layer" as formed in the embodiment of the present invention.

In the embodiment of the present invention, the patterning process may include film forming process, or include photolithography, or include photolithography and etching and also printing, ink jetting and other processes for forming specific patterns. For instance, the film forming process refers to a process for forming a film by coating, sputtering, printing, evaporation, etc. Photolithography refers to a process for forming predetermined patterns by film forming, exposure, development and other photoetching steps. In the photolithography, the predetermined patterns may be formed through the above-mentioned photoetching steps by using photoresist, mask, exposure machine, etc. For instance, a corresponding patterning process may be selected for the specific structure formed in the embodiment of the present invention.

Hereinafter an integrated front light assembly, a manufacturing method thereof and a reflective display device provided by the embodiment of the present invention will be described in details with reference to the accompanying drawings.

The inventor has realized that: the front light, the touch units and the protective substrate in the reflective display device with touch-control function are all bonded to each other by using bonding agent with certain thickness, thus a thickness of the reflective display device may be increased; moreover, a display effect of the reflective display device may be poor because it's difficult to ensure a consistent reflectivity of the bonding agent in various layers.

As illustrated in FIG. 1, the embodiment of the present invention provides an integrated front light assembly 1. The integrated front light assembly 1 may include a protective substrate 10; a touch-control layer 12 disposed on the protective substrate 10; a light guide layer 13 disposed on the touch-control layer 12; and a light source 14 disposed on at least one side of the light guide layer 13.

In the integrated front light assembly provided by the embodiment of the present invention, the touch-control layer and the light guide layer are directly disposed on the protective substrate, thus the protective substrate, the touch-control layer and the light guide layer are not required to be bonded to each other by using bonding agent as that in the prior art. That is to say, the integrated front light assembly provided by the embodiment of the present invention can reduce and even avoid the use of the bonding agent among various layers, so that the thickness of the reflective display device can be reduced. Moreover, the integrated front light assembly provided by the embodiment of the present invention no longer needs to ensure a consistent reflectivity of the bonding agent in various layers, thus the display effect of the reflective display device can be improved.

Moreover, the touch-control layer and the light guide layer both are integrated on the protective substrate, thus the integrated front light assembly provided by the embodiment of the present invention can reduce and even eliminate the use of the bonding agent in the prior art among the protective substrate, the touch-control layer and the light guide layer in the front light source. As a result, the structure of the integrated front light assembly can be simplified; the manufacturing process and the production cost can be reduced; and the product competitiveness can be improved.

In one example, a material of the protective substrate in the embodiment of the present invention may be reinforced glass (e.g., toughened glass), polyimide (PI) or polyethylene terephthalate (PET), etc. The material may be selected according to actual application demands. No specific limitation will be given in the present invention.

In one example, a refractive index of the light guide layer in the embodiment of the present invention may be ranged from 1.3 to 1.7. For instance, the refractive index of the light guide layer in the embodiment of the present invention may be 1.5.

In one example, a material of the light guide layer in the embodiment of the present invention may be epoxy resin, acrylic, silica gel or other optically transparent materials.

In one example, a thickness of the light guide layer in the embodiment of the present invention may be ranged from 50 μm to 800 μm.

The reflectivity of the light guide layer, the material of the light guide layer, the thickness of the light guide layer and other designs can well ensure that most of the light can enter the display panel so as to improve the display effect of the display panel.

In one example, in order to ensure the light emitted from the light source can well enter the light guide layer and then be well propagated in the light guide layer, a light absorption processing can be performed at a light incident side. For instance, a thickness of the light guide layer may be designed to be greater than or equal to a thickness of the light source (e.g., d1>d2 in FIG. 1). In the embodiment of the present invention, the thickness of the light guide layer and the thickness of the light source both refer to a vertical thickness, namely the thickness d1 of the light guide layer and the thickness d2 of the light source as illustrated in FIG. 1.

In one example, the integrated front light assembly provided by the embodiment of the present invention may include a plurality of light sources. For instance, the plurality of light sources may be arranged on at least one side of the light guide layer in sequence.

Figure 2:
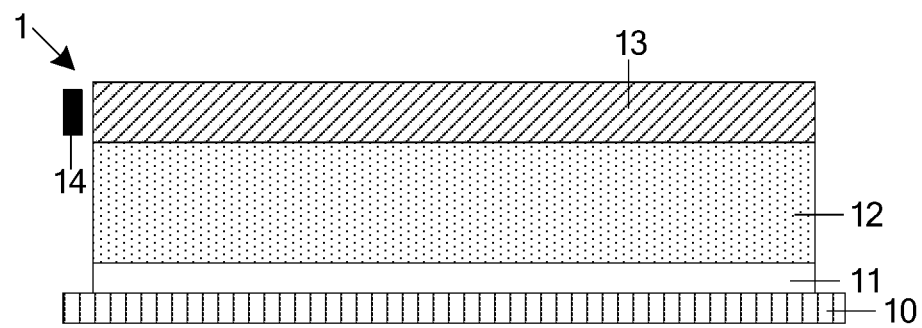
FIG. 2 is a schematic structural view II of the integrated front light assembly provided by the embodiment of the present invention.

In one example, as illustrated in FIG. 2, the integrated front light assembly 1 provided by the embodiment of the present invention may further include: a first insulating layer 11 disposed between the protective substrate 10 and the touch-control layer 12.

Figure 3:
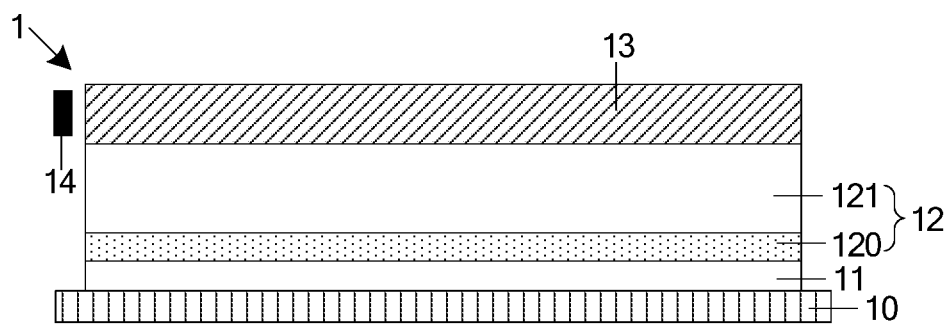
FIG. 3 is a schematic structural view III of the integrated front light assembly provided by the embodiment of the present invention.

In one example, as illustrated in FIG. 3 in combination with FIG. 2, in the integrated front light assembly 1 provided by the embodiment of the present invention, the touch-control layer 12 may include: a first touch sensing layer 120 disposed on the first insulating layer 11; and a second insulating layer 121 disposed on the first touch sensing layer 120.

Figure 4:
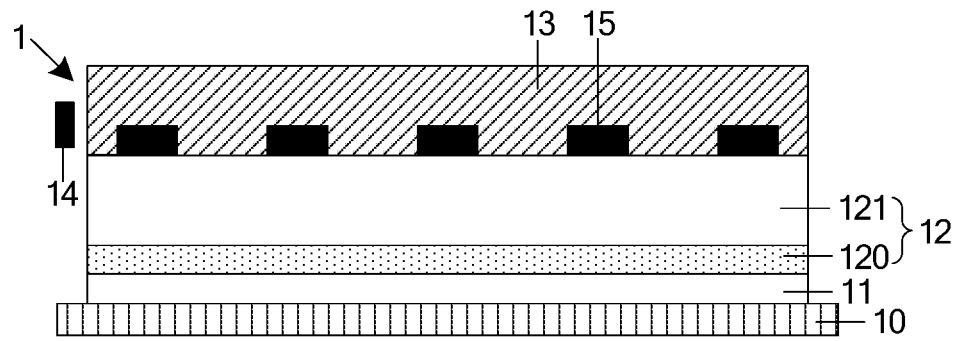
FIG. 4 is a schematic structural view IV of the integrated front light assembly provided by the embodiment of the present invention.

In one example, as illustrated in FIG. 4 in combination with FIG. 3, the integrated front light assembly 1 provided by the embodiment of the present invention may further include: a plurality of optical re-directional structures 15 disposed between the second insulating layer 121 and the light guide layer 13.

In the integrated front light assembly provided by the embodiment of the present invention, the optical re-directional structures are arranged in the touch-control layer and configured to change a propagation direction of the light emitted by the light source, so that the light emitted by the light source can uniformly irradiate the display panel corresponding to the integrated front light assembly. That is to say, the optical re-directional structures can assist the light guide layer with controlling the propagation direction of the light emitted by the light source, so that most of the light can be guided to exit the light guide layer of the integrated front light assembly and uniformly irradiate the display panel corresponding to the integrated front light assembly. In this way, the light can enter the display panel more uniform with lesser energy loss, and hence the display effect of the display panel can be improved.

It should be noted that an arrangement of the optical re-directional structures in the embodiment of the present invention is varied depending on a structure of the integrated front light assembly. That is to say, the optical re-directional structures may be arranged according to actual demands. No specific limitation will be given herein.

Hereinafter the arrangement of the optical re-directional structures will be described in more details with reference to several examples of integrated front light assembly having different structures.

In one example, a material of forming the first touch sensing layer in the embodiment of the present invention may be a transparent conductive film, e.g., an indium tin oxide (ITO) film, a silver nanowire film, a graphene film, a carbon nanotube film, or a carbon nanobud film, etc.

In one example, a thickness of the first touch sensing layer in the embodiment of the present invention may be ranged from 0.5 µm to 2 µm.

In one example, the protective substrate 10, the first insulating layer 11, the second insulating layer 121 and the light guide layer 13 as illustrated in FIG. 3 and FIG. 4 have equal refractive indexes.

In some cases, the protective substrate 10, the first insulating layer 11, the second insulating layer 121 and the light guide layer 13 as illustrated in FIG. 3 and FIG. 4 are made of different materials and subjected to different manufacturing processes and conditions, thus in actual application, equal refractive indexes cannot be easily guaranteed. In order to overcome such defect, in an embodiment of the present invention, the refractive indexes of the protective substrate 10, the first insulating layer 11, the second insulating layer 121 and the light guide layer 13 may be approximately equal, so an energy loss of light caused by a difference in refractive indexes of these layers during the light emitted by the light source propagating in these layers can be reduced to a large extent.

In one example, both the first insulating layer and the second insulating layer in the embodiment of the present invention are made of optically transparent insulating materials. For instance, a refractive index of each of the first insulating layer and the second insulating layer is ranged from 1.3 to 1.7.

In one example, a thickness of each of the first insulating layer and the second insulating layer is ranged from 1 µm to 3 µm.

Figure 5:
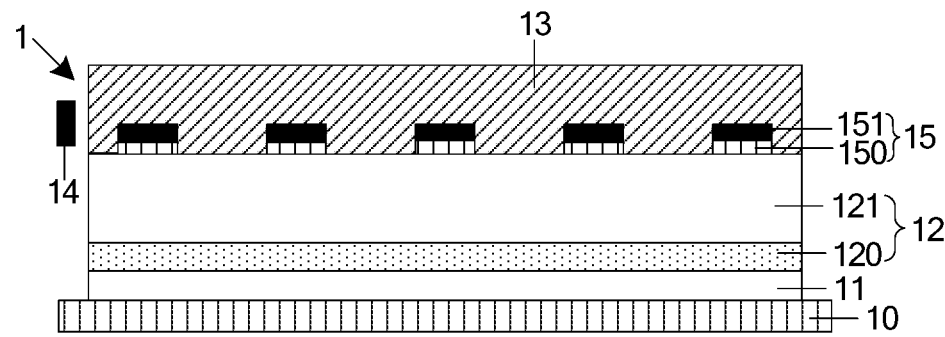
FIG. 5 is a schematic structural view V of the integrated front light assembly provided by the embodiment of the present invention.

In one example, as illustrated in FIG. 5 in combination with FIG. 4, in the integrated front light assembly 1 provided by the embodiment of the present invention, the optical re-directional structure 15 may include a first reflective pattern 150 disposed on the second insulating layer 121 and a second reflective pattern 151 disposed on the first reflective pattern 150; in which a reflectivity of the first reflective pattern 150 is less than that of the second reflective pattern 151.

In the integrated front light assembly provided by the embodiment of the present invention, the optical re-directional structure is configured to include two layers of reflective patterns with different reflectivity (namely the first reflective pattern and the second reflective pattern, wherein the reflectivity of the first reflective pattern is less than that of the second reflective pattern), thus an influence of the optical re-directional structures acting on a contrast ratio of the display panel can be reduced, and a better display effect of the display panel can be guaranteed.

In one example, a material of the first reflective pattern may be molybdenum, aluminum alloy with low reflectivity or the like, and a material of the second reflective pattern may be aluminum, silver, aluminum alloy with high reflectivity or the like. The material may be selected according to actual application demands. No limitation will be given herein.

In one example, a reflectivity and a reflection direction of the light that is emitted from the light source and then reflected by the optical re-directional structure may be adjusted by adjusting a surface roughness of the first reflective pattern and the second reflective pattern, so that most of the light can uniformly enter the display panel, and the display effect of the display device can be improved.

In one example, the reflectivity and the reflection direction of the light that is emitted from the light source and then reflected by the optical re-directional structure may also be adjusted by adjusting a size of the optical re-directional structure, a space between optical re-directional structures, a material of the optical re-directional structure, and the like, so that most of the light can uniformly enter the display panel, and the display effect of the display device can be improved.

Figure 6:
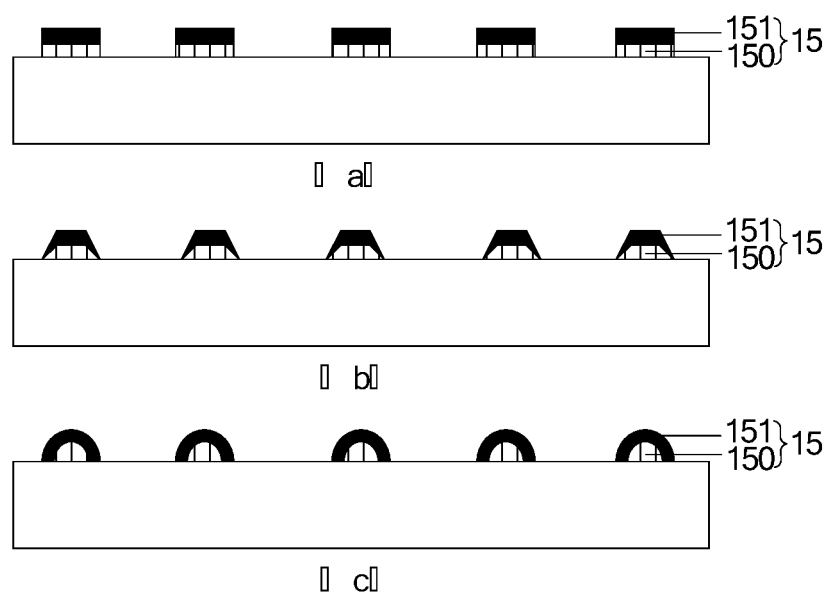
FIG. 6 is a schematic diagram illustrating a shape of an optical re-directional structure in the embodiment of the present invention.

For instance, FIG. 6 is a schematic diagram illustrating a shape of the optical re-directional structure 15 in the embodiment of the present invention. As illustrated in FIG. 6, the shape of the optical re-directional structure 15 (including the first reflective pattern 150 and the second reflective pattern 151) in the embodiment of the present invention may be cuboid, quadrangular frustum pyramid, hemispheroid or any other shapes satisfying the design requirements. No specific limitation will be given in the present invention.

For instance, as illustrated in FIG. 6(a), the shape of the optical re-directional structure is cuboid; as illustrated in FIG. 6(b), the shape of the optical re-directional structure is quadrangular frustum pyramid (FIG. 6b is a sectional view, thus the quadrangular frustum pyramid is illustrated as trapezoidal); and as illustrated in FIG. 6(c), the shape of the optical re-directional structure is hemispheroid (FIG. 6b is a sectional view, thus the hemispheroid is illustrated as semi-circular).

It should be noted that FIG. 6 only illustratively exemplifies the shape of the optical re-directional structures. The optical re-directional structure in the embodiment of the present invention may also be a combination of any two or more selected from cuboid, quadrangular frustum pyramid, hemispheroid and the like. For instance, in actual application, the number of the optical re-directional structures in the embodiment of the present invention is generally more than one; and the shape of the plural optical re-directional structures may be one of the shapes as listed above, and may also be a combination of any two or more of the shapes as listed above. Regarding the exemplary structures of the optical re-directional structures with the shapes as listed above, reference may be made respectively to FIGS. 6(a), 6(b) and 6(c). No further description will be given here.

In one example, the plurality of optical re-directional structures in the embodiment of the present invention may be formed on a surface of the second insulating layer as illustrated in FIG. 6, so that the manufacturing process can be more convenient and simplified. For instance, a plurality of recesses may be formed in the surface of the second insulating layer, and each of the optical re-directional structures may be disposed in one of the recesses.

Figure 7:
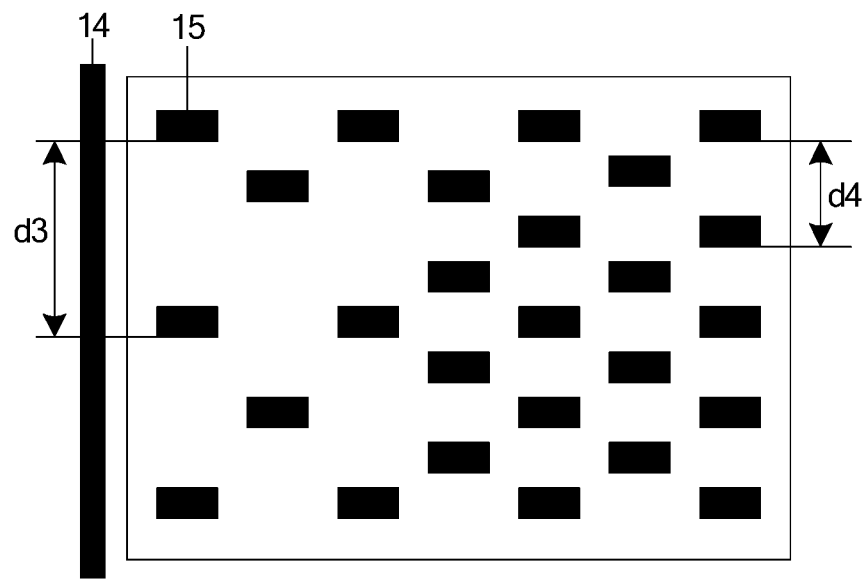
FIG. 7 is a schematic diagram illustrating an arrangement of optical re-directional structures in the embodiment of the present invention.

In one example, as illustrated in FIG. 7, in the integrated front light assembly provided by the embodiment of the present invention, the optical re-directional structures 15 constitute a plurality of optical re-directional structure columns; each of the optical re-directional structure columns includes a plurality of optical re-directional structures; and the optical re-directional structures of any two adjacent optical re-directional structure columns are in staggered arrangement. In this way, it ensures the light in a specific region to be uniform, and hence improves the display effect of the display panel.

For instance, in the integrated front light assembly as illustrated in FIG. 7, the optical re-directional structures in each of the optical re-directional structure columns are spaced at equal interval. A space between the optical re-directional structures located on a side close to the light source 14 is greater than that of the optical re-directional structures located on a side away from the light source 14. For instance, as illustrated in FIG. 7, d3>d4. In this example, the smaller the distance from the light source 14 is, the larger the space between the optical re-directional structures will be, namely the optical re-directional structures are arranged at higher density; and the larger the distance from the light source 14 is, the smaller the space between the optical re-directional structures will be, namely the optical re-directional structures are arranged at lower density. Such arrangement can ensure that the optical re-directional structures close to the light source and the optical re-directional structures far away from the light source have basically consistent light reflection (including reflectivity and reflection direction), because the light closer to the light source has stronger intensity and the light far away from the light source has weaker intensity; in this way, the uniformity of the light entering the display panel can be better guaranteed.

In the integrated front light assembly provided by the embodiment of the present invention, the structure of the integrated front light assembly and the arrangement of the optical re-directional structures may be varied depending on a structure of the touch-control layer. Thus, further description of the structure of the integrated front light assembly and the arrangement of the optical re-directional structures will be given as below, respectively, with reference to different structures of the touch-control layer.

In one example, the touch-control layer in the embodiment of the present invention may be a two-bridging-layered touch sensing layer, a single-layered touch sensing layer or a two-independent-layered touch sensing layer in view of the structure.

Figure 8:
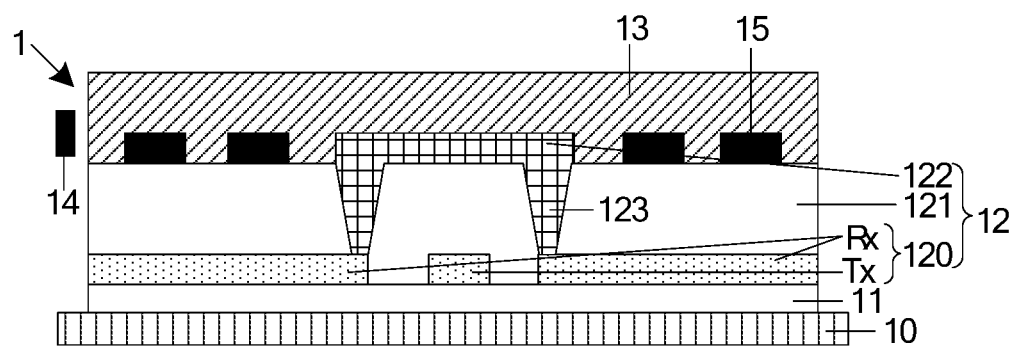
FIG. 8 is a schematic structural view VI of the integrated front light assembly provided by the embodiment of the present invention.

FIG. 8 is a schematic diagram illustrating a structure of the integrated front light assembly and the arrangement of the optical re-directional structures for a touch-control layer which is a two-bridging-layered touch sensing layer.

In one example, as illustrated in FIG. 8 in combination with FIG. 4, the first touch sensing layer 120 includes touch sensing electrodes (represented by Rx in FIG. 8) and touch drive electrodes (represented by Tx in FIG. 8). The touch-control layer 12 further includes a bridge metal layer 122 disposed on the second insulating layer 121.

The bridge metal layer 122 as illustrated in FIG. 8 is connected with the touch sensing electrodes through via holes 123 in the second insulating layer 121. However, in other examples, the bridge metal layer 122 may be connected with the touch drive electrodes through the via holes in the second insulating layer (not illustrated in FIG. 8).

It should be noted that: for the first touch sensing layer including the touch sensing electrodes Rx and the touch drive electrodes Tx, the bridge metal layer is only required to be connected with any two adjacent touch sensing electrodes Rx or with any two adjacent touch drive electrodes Tx. Illustrative description is given in FIG. 8 with reference to the case where the bridge metal layer 122 is connected with any two adjacent touch sensing electrodes Rx, by way of example.

Figure 9:
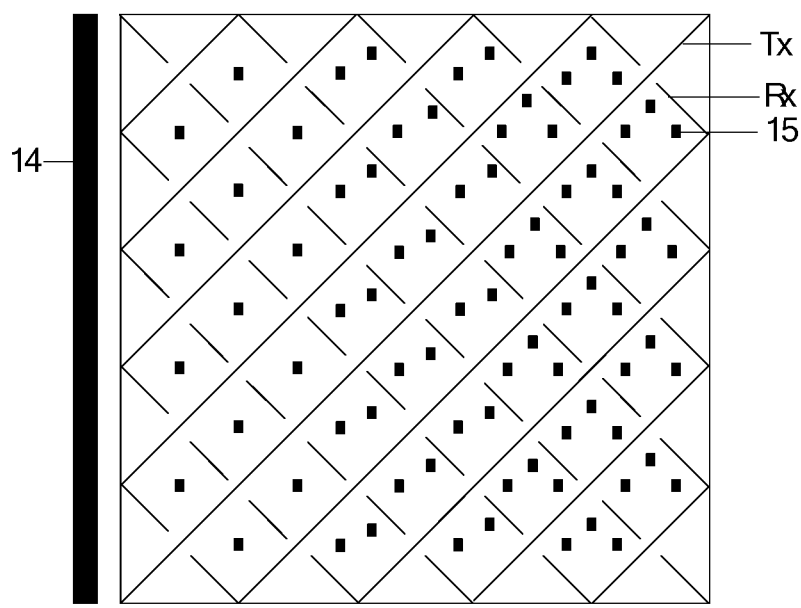
FIG. 9 is a schematic structural view VII of the integrated front light assembly provided by the embodiment of the present invention.
Figure 10:
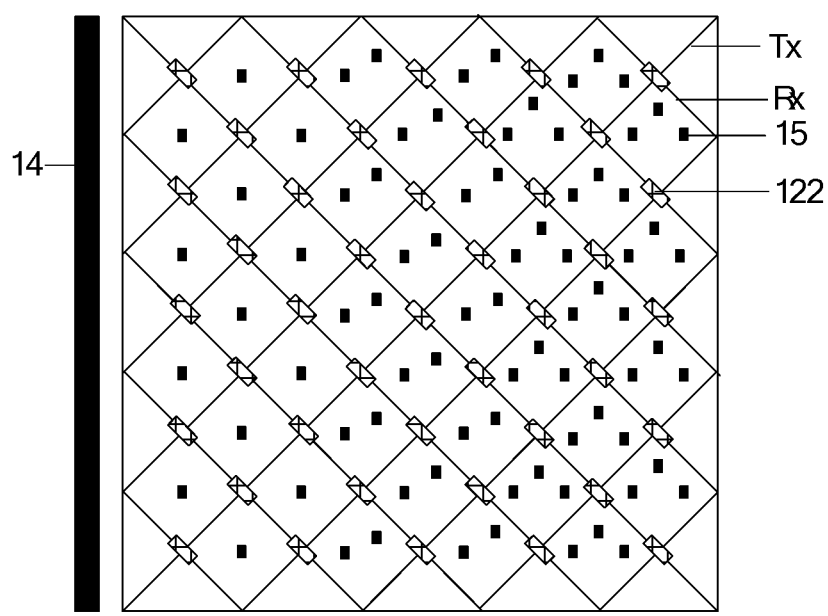
FIG. 10 is a schematic structural view VIII of the integrated front light assembly provided by the embodiment of the present invention.

FIGS. 9 and 10 are schematic top views of the first touch sensing layer, the bridge metal layer and the optical re-directional structures as illustrated in FIG. 8.

With reference to FIGS. 8, 9 and 10, in one example, when the bridge metal layer 122 is connected with any two adjacent touch sensing electrodes Rx through the via holes 123 in the second insulating layer 121, Tx is a continuous conducting wire. When the bridge metal layer 122 is connected with any two adjacent touch drive electrodes Tx through the via holes 123 in the second insulating layer 121, Rx is a continuous conducting wire.

In one example, the bridge metal layer 122 includes a plurality of bridge metal electrodes. For instance, in the integrated front light assembly 1 as illustrated in FIG. 8, the plurality of optical re-directional structures 15 may be arranged on both sides of each of the bridge metal electrodes. For instance, the plurality of optical re-directional structures 15 may be arranged on both sides of each of the bridge metal electrodes as that illustrated in FIG. 9 and FIG. 10. Of course, FIG. 9 and FIG. 10 only illustratively exemplify one of the possible arrangements of the plurality of optical re-directional structures, which may also be arranged in other manners not illustrated. No specific limitation will be given herein.

For instance, a material of the bridge metal layer in the embodiment of the present invention may be aluminum, copper or other metals satisfying the specific application requirements. No specific limitation will be given herein.

For instance, a thickness of the bridge metal layer in the embodiment of the present invention may be ranged from 1 µm to 3 µm.

For instance, in the integrated front light assembly 1 as illustrated in FIG. 8, to ensure the light transmission, a sum of a total area occupied by the plurality of optical re-directional structures 15 and an area occupied by the bridge metal layer 122 (a plurality of bridge metal electrodes) may be less than or equal to ten percent (namely 10%) of an area of the display panel.

Figure 11:
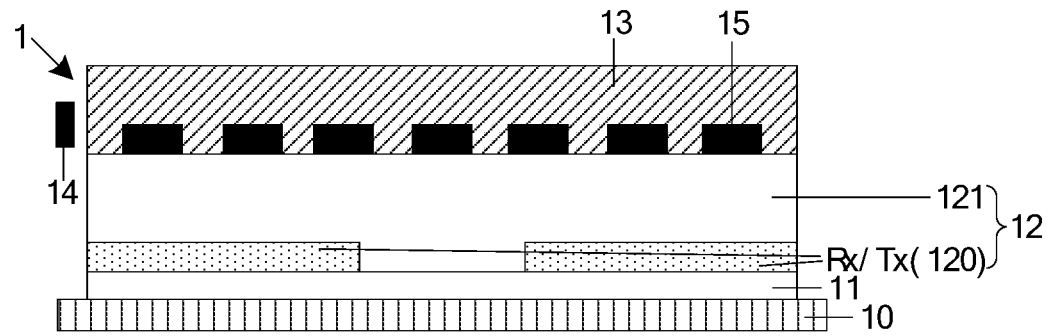
FIG. 11 is a schematic structural view IX of the integrated front light assembly provided by the embodiment of the present invention.

FIG. 11 is a schematic diagram illustrating the structure of the integrated front light assembly and the arrangement of the optical re-directional structures when the touch-control layer is a single-layered touch sensing layer.

In one example, as illustrated in FIG. 11 in combination with FIG. 4, the first touch sensing layer 120 is a touch sensing electrode (represented by Rx in FIG. 11) or a touch drive electrode (represented by Tx in FIG. 11).

In the integrated front light assembly 1 as illustrated in FIG. 11, for instance, the plurality of optical re-directional structures 15 may be arranged on the second insulating layer 121.

Figure 12:
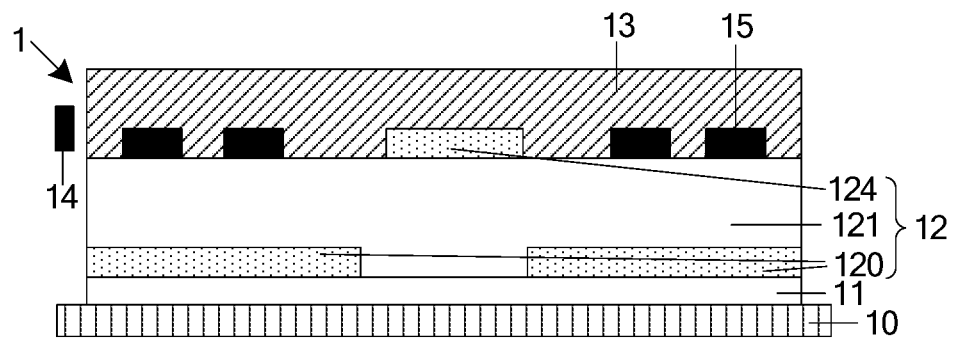
FIG. 12 is a schematic structural view X of the integrated front light assembly provided by the embodiment of the present invention.

FIG. 12 is a schematic diagram illustrating the structure of the integrated front light assembly and the arrangement of the optical re-directional structures when the touch-control layer is a two-independent-layered touch sensing layer.

In one example, as illustrated in FIG. 12 in combination with FIG. 4, the first touch sensing layer 120 is a touch sensing electrode (may be represented by Rx) or a touch drive electrode (may be represented by Tx). The touch-control layer may further include a second touch sensing layer 124 disposed on the second insulating layer 121.

For instance, the first touch sensing layer 120 is a touch sensing electrode, and the second touch sensing layer 124 is a touch drive electrode.

Alternatively, the first touch sensing layer 120 is a touch drive electrode, and the second touch sensing layer 124 is a touch sensing electrode.

In the integrated front light assembly 1 as illustrated in FIG. 12, for instance, the plurality of optical re-directional structures 15 may be arranged on the second insulating layer 121, at both sides of the second touch sensing layer 124 (which may be a touch drive electrode or a touch sensing electrode).

For instance, a material of the second touch sensing layer in the embodiment of the present invention may be a transparent conductive film, e.g., an ITO film, a silver nanowire film, a graphene film, a carbon nanotube film or a carbon nanobud film.

For instance, a thickness of the second touch sensing layer in the embodiment of the present invention may be ranged from 0.5 μm to 2 μm.

The specific arrangement of the plurality of optical re-directional structures 15 as illustrated in FIGS. 8, 11 and 12 may refer to that of the plurality of optical re-directional structures 15 as illustrated in FIG. 7. No further description will be given herein.

Figure 13:
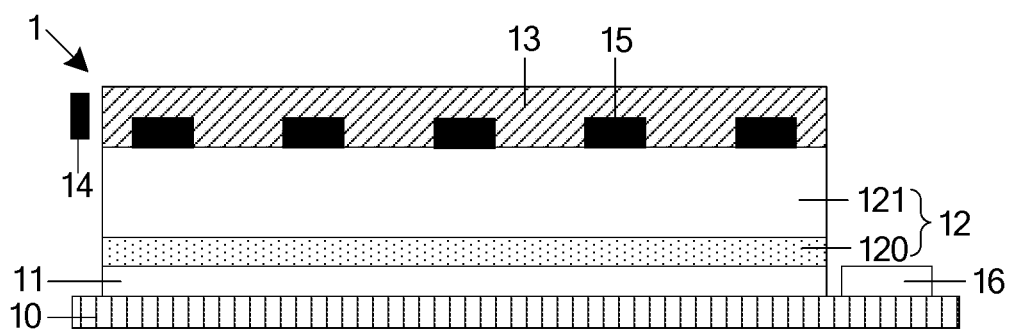
FIG. 13 is a schematic structural view XI of the integrated front light assembly provided by the embodiment of the present invention.

In one example, as illustrated in FIG. 13 in combination with FIG. 4, the integrated front light assembly 1 provided by the embodiment of the present invention may further include a touch-control module 16 disposed on the protective substrate 10, at one side of the first insulating layer 11.

For instance, the touch-control module in the embodiment of the present invention may be a touch-control processing chip. Alternatively, for instance, the touch-control module in the embodiment of the present invention may be a flexible printed circuit (FPC). The FPC is connected to a touch-control processing chip via a wire lead disposed on the protective substrate. The touch-control module may be specifically designed according to actual application demands. No limitation will be given herein.

For instance, in the embodiment of the present invention, the touch-control module may be disposed on the protective substrate, at one side of the first insulating layer, by welding. The touch-control module, for instance, may be connected with a master chip of the display device, so as to respond to a touch operation of a user.

It should be noted that: in the embodiment of the present invention, a thickness of each of the layers described above refers to a vertical thickness of the layer in a vertical direction of the accompanying drawings; specifically, reference may be made to the thickness d1 of the light guide layer and the thickness d2 of the light source as illustrated in FIG. 1.

As described above, the integrated front light assembly provided by the embodiment of the present invention includes: the protective substrate; the touch-control layer disposed on the protective substrate; the light guide layer disposed on the touch-control layer; and the light source disposed on at least one side of the light guide layer. The touch-control layer and the light guide layer in the integrated front light assembly provided by the embodiment of the present invention are directly disposed on the protective substrate, thus the protective substrate, the touch-control layer and the light guide layer no longer need to be bonded to each other by using a bonding agent, namely the integrated front light assembly provided by the embodiment of the present invention eliminates the need of using bonding agent among layers. In this way, the thickness of the reflective display device can be reduced, and the display effect of the reflective display device can be improved.

Another embodiment of the present invention provides a reflective display device. The reflective display device includes a display panel and the integrated front light assembly provided by any one of the above embodiments. The light guide layer in the integrated front light assembly is bonded to the display panel by using bonding agent.

Figure 14:
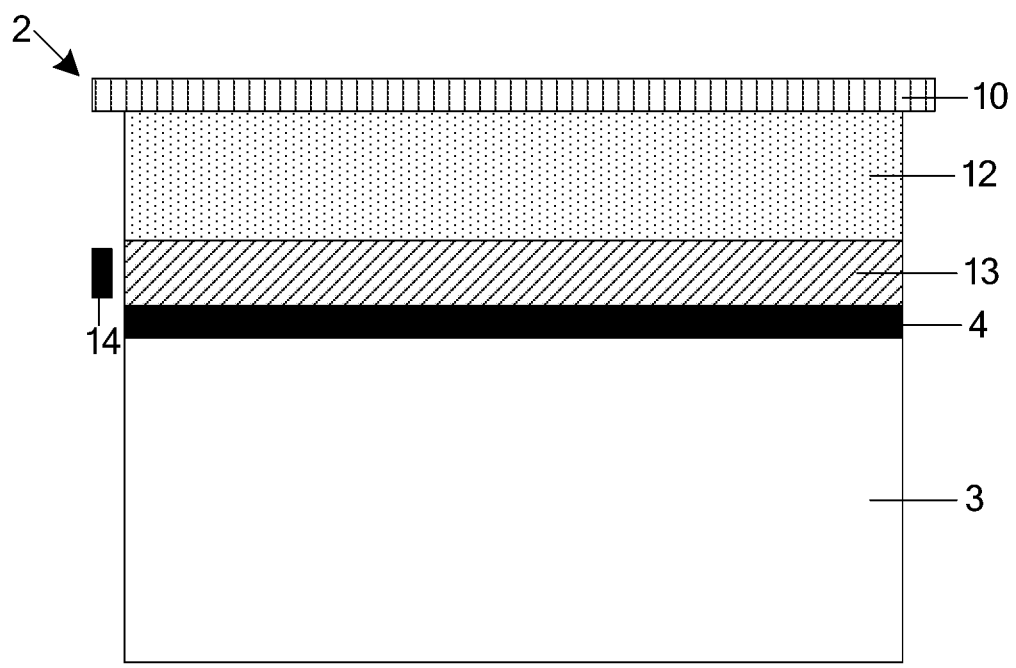
FIG. 14 is a schematic structural view I of a reflective display device provided by the embodiment of the present invention.

FIG. 14 is a schematic structural view of a reflective display device 2 provided by the embodiment of the present invention. Illustrative description is given in FIG. 14 with reference to the integrated front light assembly as illustrated in FIG. 1 (including the protective substrate 10, the touch-control layer 12, the light guide layer 13 and the light source 14) by way of example only. In FIG. 14, the light guide layer 13 in the integrated front light assembly is bonded to a display panel 3 by using a bonding agent 4.

The display panel in the embodiment of the present invention may be a reflective liquid crystal display (LCD) panel or a reflective electrophoretic display panel, and may also be a reflective electrowetting display panel or other reflective display panels. No specific limitation will be given herein.

Figure 15:
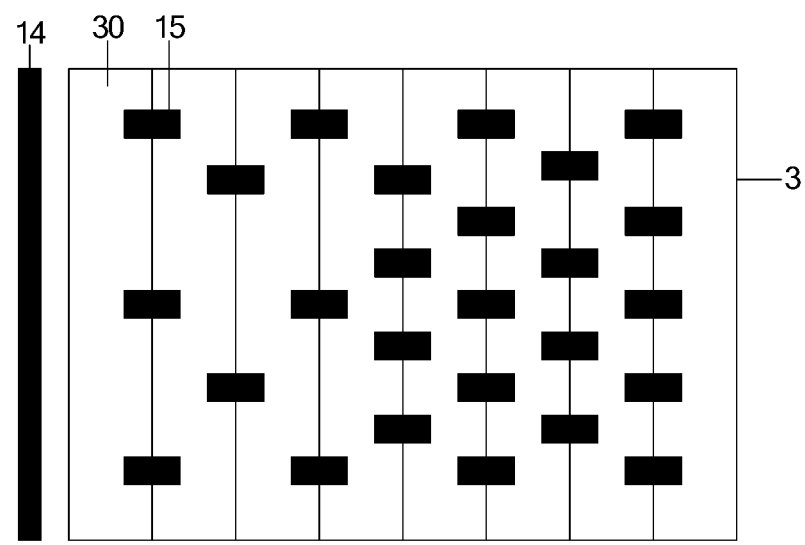
FIG. 15 is a schematic structural view II of the reflective display device provided by the embodiment of the present invention.

In one example, as illustrated in FIG. 15, the display panel 3 in the embodiment of the present invention includes a plurality of sub-pixel columns 30; the integrated front light assembly includes a plurality of optical re-directional structures 15; and the sub-pixel columns 30 are disposed in correspondence with the optical re-directional structures 15, respectively. For instance, the optical re-directional structures corresponding to any two adjacent sub-pixel columns are disposed in staggered arrangement.

The arrangement of the plurality of optical re-directional structures 15 as illustrated in FIG. 15 may ensure the light in a certain pixel region to be uniform, so that the display effect of the display panel can be improved.

In one example, plural optical re-directional structures 15 may be arranged corresponding to plural black matrixes (BMs) in the sub-pixel columns 30 respectively, so that the ambient light may be less blocked by the optical re-directional structures but more enter the display panel. In this way, the display effect of the display panel can be improved.

In the reflective display device provided by the embodiment of the present invention, the touch-control layer and the light guide layer in the integrated front light assembly are directly disposed on the protective substrate, thus the protective substrate, the touch-control layer and the light guide layer no longer need to be bonded to each other by using a bonding agent, namely the integrated front light assembly provided by the embodiment of the present invention eliminates the need of using the bonding agent among the layers. Thus, the thickness of the reflective display device can be reduced, and the display effect of the reflective display device can be improved.

Moreover, both the touch-control layer and the light guide layer in the integrated front light assembly provided by the embodiment of the present invention are integrated on the protective substrate, thus the need of using a bonding agent among the protective substrate, the touch-control layer and the light guide layer in the integrated front light assembly can be eliminated. Therefore, the structure of the integrated front light assembly can be simplified, the manufacturing process and cost of the integrated front light assembly can be reduced, and hence the product competitiveness can be improved.

Figure 16:
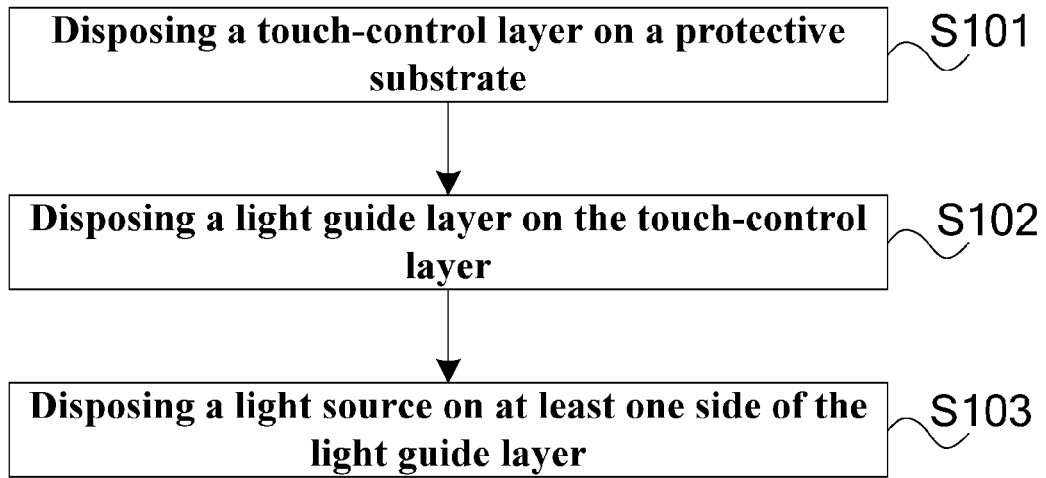
FIG. 16 is a flowchart I of a manufacturing method of an integrated front light assembly provided by the embodiment of the present invention.

As illustrated in FIG. 16, still another embodiment of the present invention provides a manufacturing method of an integrated front light assembly. The manufacturing method may include the following steps.

S101: disposing a touch-control layer on a protective substrate.

The material of the protective substrate may refer to the relevant description on the material of the protective substrate in the embodiment as illustrated in FIG. 1. No further description will be given herein.

Hereinafter illustrative structures of the touch-control layer and the relevant parameters thereof will be described in more details with reference to the following embodiments.

S102: disposing a light guide layer on the touch-control layer.

In the step S102, the light guide layer may be formed by a film forming process, for example, by coating an optically transparent material on the touch-control layer.

The material, the refractive index and the thickness of the light guide layer may refer to the relevant description on the material, the refractive index and the thickness of the light guide layer in the embodiment as illustrated in FIG. 1. No further description will be given herein.

S103: disposing a light source on at least one side of the light guide layer.

In the step S103, the light source may be bonded to at least one side of the light guide layer. For instance, the light source may be bonded to one side of the light guide layer by using a bonding agent.

In one example, the manufacturing method of the integrated front light assembly provided by the embodiment of the present invention may further include the following steps.

S101a: disposing a first insulating layer between the protective substrate and the touch-control layer.

Figure 17:
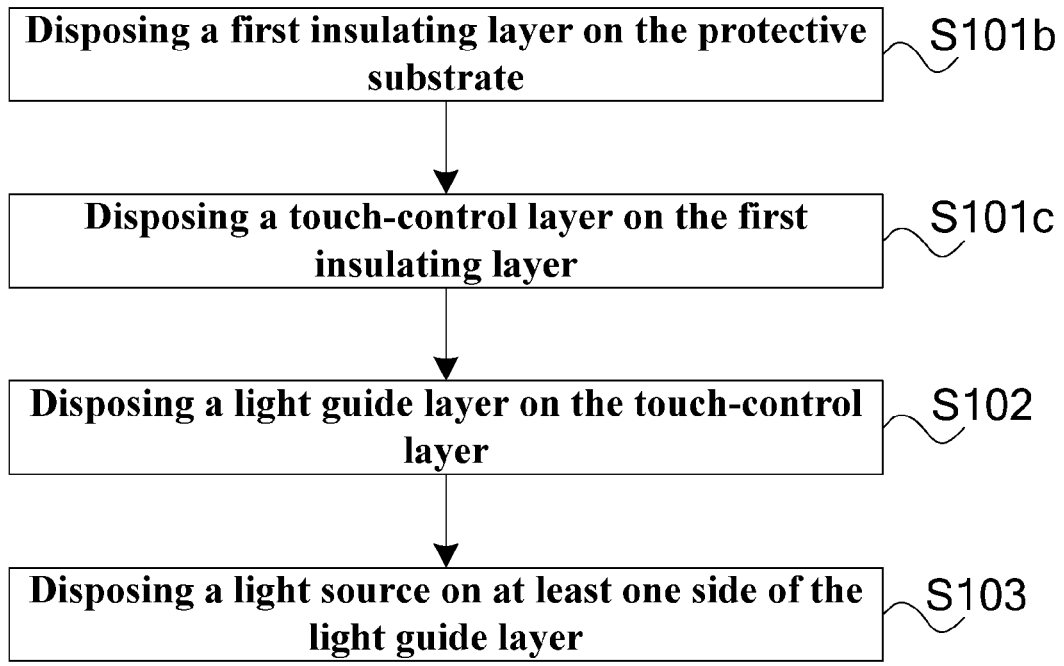
FIG. 17 is a flowchart II of the manufacturing method of the integrated front light assembly provided by the embodiment of the present invention.

For instance, with reference to FIG. 16 and as illustrated in FIG. 17, the steps S101 and S101a, namely disposing the first insulating layer and the touch-control layer on the protective substrate, include the following steps S101b-S101c.

S101b: disposing the first insulating layer on the protective substrate.

S101c: disposing the touch-control layer on the first insulating layer.

With reference to the steps S101 and S101a, in the steps S101b and S101c, for instance, firstly, the protective substrate may be washed up; secondly, black matrixes (BMs) may be coated on a frame of the protective substrate to shield wirings at a peripheral of the protective substrate; thirdly, the first insulating layer is formed by coating an optically transparent insulating material on the protective substrate through a film forming process; and finally, the touch-control layer is formed on the first insulating layer by a corresponding patterning process.

Figure 18:
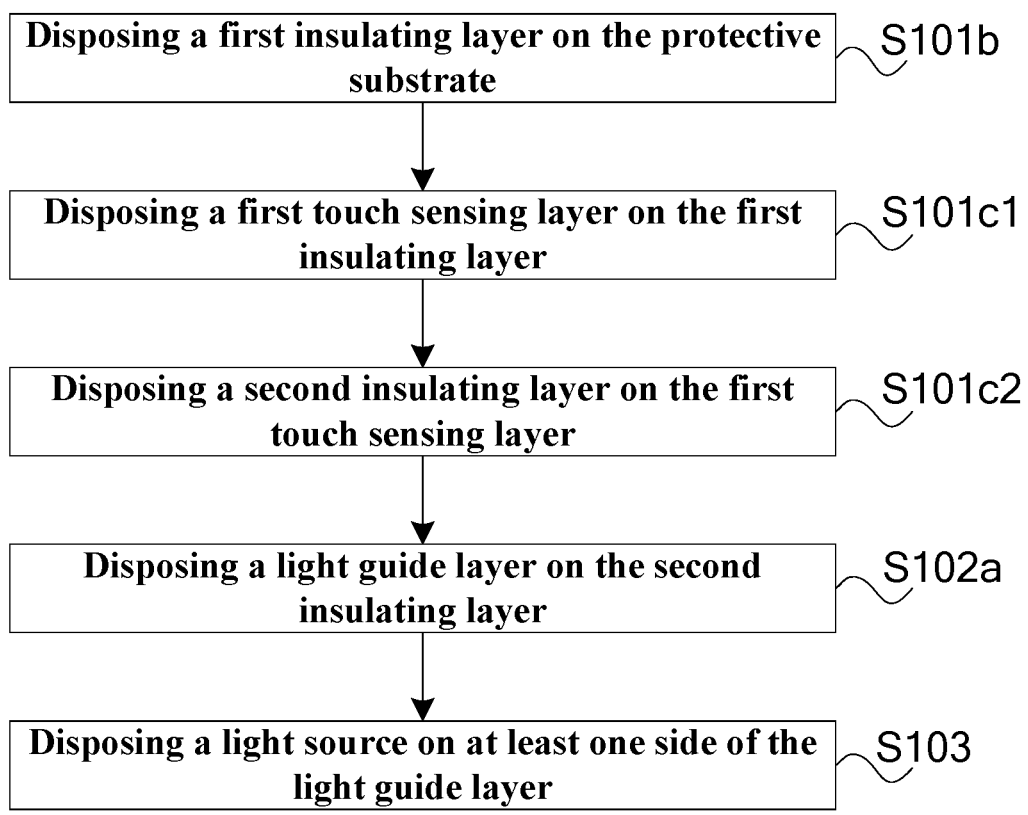
FIG. 18 is a flowchart III of the manufacturing method of the integrated front light assembly provided by the embodiment of the present invention

In one example, the touch-control layer in the step S102 includes a first touch sensing layer and a second insulating layer. With reference to FIG. 17 and as illustrated in FIG. 18, the step S101c may include the following steps S101c1 and S101c2.

S101c1: disposing the first touch sensing layer on the first insulating layer.

In the embodiment of the present invention, the first touch sensing layer may be formed by a patterning process. For instance, firstly, a touch sensing layer metal film is formed on the first insulating layer by sputtering, printing, evaporation or other film forming processes; secondly, the touch sensing layer metal film is subjected to photoetching steps such as exposure and development by using photoresist, mask, exposure machine and the like, so as to form the first touch sensing layer.

The material and the thickness of the first touch sensing layer may refer to the relevant description on the material and the thickness of the first touch sensing layer in the embodiment as illustrated in FIGS. 3 and 4. No further description will be given herein.

S101c2: disposing the second insulating layer on the first touch sensing layer.

For instance, the second insulating layer may be formed by a film forming process, for example, by coating an optically transparent insulating material on the first touch sensing layer.

The refractive index and the thickness of the second insulating layer may refer to the relevant description on the refractive index and the thickness of the second insulating layer in the embodiment as illustrated in FIG. 3 and FIG. 4. No further description will be given herein.

For instance, as illustrated in FIG. 18, the step S102 may include S102a: disposing the light guide layer on the second insulating layer.

In one example, the manufacturing method of the integrated front light assembly provided by the embodiment of the present invention may further include S104: disposing a plurality of optical re-directional structures between the second insulating layer and the light guide layer.

The manufacturing process of the steps S102a and S104 includes: disposing the plurality of optical re-directional structures on the second insulating layer, and disposing the light guide layer on the plurality of optical re-directional structures. In the embodiment of the present invention, the plurality of optical re-directional structures may be formed on the second insulating layer by a corresponding patterning process, and the light guide layer may be formed on the plurality of optical re-directional structures by a film forming process.

For instance, the optical re-directional structures may be formed by two reflective layers with different reflectivity, namely a first reflective layer and a second reflective layer, wherein the first reflective layer includes a plurality of first reflective patterns, and the second reflective layer includes a plurality of second reflective patterns disposed on the first reflective patterns; the reflectivity of the first reflective layer is smaller than that of the second reflective layer. In one example, the process of forming the plurality of optical re-directional structures on the second insulating layer may include steps as below.

(i) disposing the first reflective layer on the second insulating layer; and (ii) disposing the second reflective layer on the first reflective layer.

For instance, in the embodiment of the present invention, the first reflective layer may be formed on the second insulating layer by a corresponding patterning process, and the second reflective layer may be formed on the first reflective layer by a corresponding patterning process.

For instance, the first reflective layer and the second reflective layer may be formed by the same patterning process.

For instance, the first reflective layer and the second reflective layer may be formed by a single patterning process. For instance, firstly, two metal film layers are formed by a film forming process; and then the two metal film layers are subjected to a photolithography in sequence.

For instance, the first reflective layer and the second reflective layer may also be formed by two patterning processes. For instance, firstly, a first metal film layer is formed by a film forming process; secondly, the first metal film is subjected to a photolithography; thirdly, a second metal film layer is formed by a film forming process; and finally, the second metal film layer is subjected to a photolithography. No specific limitation will be given herein.

Description of the first reflective layer and the second reflective layer may refer to that of the first reflective patterns and the second reflective patterns in the embodiment as illustrated in FIG. 5. No further description will be given herein.

In the embodiment of the present invention, the optical re-directional structures are configured as two reflective layers with different reflectivity, thus the influence of the optical re-directional structures on the contrast ratio of the display panel can be reduced, and hence better display effect of the display panel can be guaranteed.

In one example, the touch-control layer in the embodiment of the present invention may be a two-bridging-layered touch sensing layer, a single-layered touch sensing layer or a two-independent-layered touch sensing layer.

For instance, for the touch-control layer in a form of two-bridging-layered touch sensing layer, the first touch sensing layer includes a touch sensing electrode and a touch drive electrode.

In one example, the manufacturing method of the integrated front light assembly provided by the embodiment of the present invention may further include S105: disposing a bridge metal layer on the second insulating layer.

For instance, the bridge metal layer may be formed on the second insulating layer by a corresponding patterning process. For instance, the steps S105 and S104 may be simultaneously executed, namely the optical re-directional structures and the bridge metal layer are simultaneously formed on the second insulating layer by a single patterning process. Thus, the manufacturing process can be simplified.

For instance, the bridge metal layer is connected with the touch sensing electrode through a via hole in the second insulating layer. Alternatively, the bridge metal layer is connected with the touch drive electrode through the via hole in the second insulating layer.

In the embodiment of the present invention including the step S105, after the step S101c2 (disposing the second insulating layer on the first touch sensing layer), the second insulating layer has to be perforated (to form the via hole), and then the bridge metal layer is formed on the second insulating layer so that the bridge metal layer can be connected with the touch sensing electrode or the touch drive electrode through the via hole in the second insulating layer.

The examples of the two-bridging-layered touch sensing layer, the structure of the integrated front light assembly and the plurality of optical re-directional structures may refer to the relevant description on the two-bridging-layered touch sensing layer, the structure of the integrated front light assembly and the plurality of optical re-directional structures in the embodiment as illustrated in FIGS. 8, 9 and 10. No further description will be given herein.

The examples of the material and the thickness of the bridge metal layer may refer to the relevant description on the material and the thickness of the bridge metal layer in the embodiment as illustrated in FIG. 8. No further description will be given herein.

For instance, for the touch-control layer in a form of a single-layered touch sensing layer, the first touch sensing layer is a touch sensing electrode or a touch drive electrode.

The examples of the single-layered touch sensing layer, the structure of the integrated front light assembly and the optical re-directional structures may refer to the relevant description on the single-layered touch sensing layer, the structure of the integrated front light assembly and the optical re-directional structures in the embodiment as illustrated in FIG. 11. No further description will be given herein.

For instance, for the touch-control layer in a form of a two-independent-layered touch sensing layer, the first touch sensing layer is a touch sensing electrode or a touch drive electrode.

In one example, the manufacturing method of the integrated front light assembly provided by the embodiment of the present invention may further include S106: disposing a second touch sensing layer on the second insulating layer.

For instance, when the first touch sensing layer is a touch sensing electrode, the second sensing layer is a touch drive electrode; alternatively, when the first touch sensing layer is a touch drive electrode, the second sensing layer is a touch sensing electrode.

For instance, the second touch sensing layer may be formed on the second insulating layer by a corresponding patterning process.

The examples of the material and the thickness of the second touch sensing layer may refer to the relevant description on the material and the thickness of the second touch sensing layer in the embodiment as illustrated in FIG. 12. No further description will be given herein.

The examples of the two-independent-layered touch sensing layer, the structure of the integrated front light assembly and the optical re-directional structures may refer to the relevant description on the two-independent-layered touch sensing layer, the structure of the integrated front light assembly and the optical re-directional structures in the embodiment as illustrated in FIG. 12. No further description will be given herein.

In one example, after the step S102 (disposing the light guide layer on the touch-control layer), the manufacturing method of the integrated front light assembly provided by the embodiment of the present invention may further include S107: disposing a touch-control module on the protective substrate, at one side of the first insulating layer.

The examples of the touch-control module may refer to the relevant description on the touch-control module in the embodiment as illustrated in FIG. 13. No further description will be given herein.

For instance, the touch-control module may be disposed on the protective substrate, at one side of the first insulating layer, by welding. The touch-control module may be connected with a master chip of a display device and configured to respond to a touch operation of a user.

It should be noted that the execution sequence of the steps S103 and S107 is not limited in the embodiment of the present invention. That is to say, in the embodiment, S103 may be executed prior to S107, or S107 may be executed prior to S103; or S103 and S107 may be simultaneously executed.

In one example, the above-mentioned metal layers such as the first touch sensing layer, the first reflective layer, the second reflective layer, the bridge metal layer and the second touch sensing layer may be all formed by patterning processes. For instance, the first touch sensing layer, the first reflective layer, the second reflective layer, the bridge metal layer and the second touch sensing layer may be formed by a photolithography or by a combination of photolithography and etching process described in the embodiment of the present invention.

For instance, the first insulating layer, the second insulating layer, the light guide layer and the like may be all formed by film forming processes. No further description will be given herein.

As described above, the manufacturing method of the integrated front light assembly provided by the embodiment of the present invention includes: disposing the touch-control layer on the protective substrate; disposing the light guide layer on the touch-control layer; and disposing the light source on at least one side of the light guide layer. The touch-control layer and the light guide layer may be directly formed on the protective substrate, thus the protective substrate, the touch-control layer and the light guide layer no longer need to be bonded to each other by using a bonding agent, namely the integrated front light assembly provided by the embodiment of the present invention eliminates the need of using the bonding agent among the layers. As a result, the thickness of the reflective display device can be reduced, and the display effect of the reflective display device can be improved.

Moreover, both the touch-control layer and the light guide layer are integrated on the protective substrate in the manufacturing method of the integrated front light assembly provided by the embodiment of the present invention, thus the need of using a bonding agent among the protective substrate, the touch-control layer and the light guide layer in the front light assembly can be eliminated. As a result, the structure of the integrated front light assembly can be simplified; the manufacturing process and production cost of the integrated front light assembly can be reduced; and hence the product competitiveness can be improved.

The foregoing are merely specific embodiments of the invention, but not limitative to the protection scope of the invention. Within the technical scope disclosed by the present invention, any alternations or replacements which can be readily envisaged by one skilled in the art shall be within the protection scope of the present invention. Therefore, the protection scope of the invention shall be defined by the accompanying claims.

The present invention claims the benefits of Chinese patent application No. 201510276633.X filed with the SIPO on May 26, 2015 under the title of "INTEGRATED FRONT LIGHT ASSEMBLY, MANUFACTURING METHOD THEREOF, AND REFLECTIVE DISPLAY DEVICE", which is fully incorporated herein by reference as part of this application.

What is claimed is:

1. An integrated front light assembly, comprising:
a protective substrate;
a touch-control layer, disposed on the protective substrate;
a light guide layer, disposed on the touch-control layer; and
a light source disposed on at least one side of the light guide layer, wherein
both of the touch-control layer and the light guide layer are integrated and directly disposed on the protective substrate in such a manner that no bonding agent is provided among the touch-control layer, the light guide layer, and the protective substrate,
the integrated front light assembly further comprises: a first insulating layer, disposed between the protective substrate and the touch-control layer,
the touch-control layer comprises: a first touch sensing layer, disposed on the first insulating layer; and a second insulating layer, disposed on the first touch sensing layer, wherein
a plurality of optical re-directional structures are disposed between the second insulating layer and the light guide layer in such a manner that a space between the optical re-directional structures located on a side close to the light source is greater than that of optical re-directional structures located on a side far away from the light source,
each of the optical re-directional structures comprises:
a first reflective pattern, disposed on the second insulating layer and protruded from a surface of the second insulating layer; and
a second reflective pattern, disposed on the first reflective pattern,
wherein the first reflective pattern and the second reflective pattern are stacked one on another and are parallel to each other, and
the first reflective pattern is made of a material with a low reflectivity and the second reflective pattern is made of a material with a high reflectivity, so that a reflectivity of the first reflective pattern is smaller than that of the second reflective pattern.

2. The integrated front light assembly according to claim 1, wherein each of the optical re-directional structures has a shape of any one of cuboid, quadrangular frustum pyramid, and hemispheroid.

3. The integrated front light assembly according to claim 1, wherein the optical re-directional structures are arranged in a plurality of columns; each of the columns comprises a plurality of the optical re-directional structures; and optical re-directional structures of any two adjacent columns are arranged in staggered manner.

4. The integrated front light assembly according to claim 3, further comprising:
a touch-control module, disposed on the protective substrate, at one side of the first insulating layer.

5. The integrated front light assembly according to claim 1, wherein the first touch sensing layer comprises a touch sensing electrode and a touch drive electrode; and
the touch-control layer further comprises a bridge metal layer disposed on the second insulating layer,
wherein the bridge metal layer is connected with the touch sensing electrode through a via hole in the second insulating layer; or the bridge metal layer is connected with the touch drive electrode through a via hole in the second insulating layer.

6. The integrated front light assembly according to claim 1, wherein the first touch sensing layer is a touch sensing electrode or a touch drive electrode.

7. The integrated front light assembly according to claim 6, wherein the touch-control layer further comprises: a second touch sensing layer, disposed on the second insulating layer, wherein
the first touch sensing layer is a touch sensing electrode, and the second touch sensing layer is a touch drive electrode; or,
the first touch sensing layer is a touch drive electrode, and the second touch sensing layer is a touch sensing electrode.

8. A reflective display device, comprising:
a display panel; and
the integrated front light assembly according to claim 1, wherein the light guide layer in the integrated front light assembly is bonded to the display panel by a bonding agent.

9. A manufacturing method of an integrated front light assembly, comprising:
disposing a touch-control layer on a protective substrate;
disposing a light guide layer on the touch-control layer; and
disposing a light source on at least one side of the light guide layer, wherein
both of the touch-control layer and the light guide layer are integrated and directly disposed on the protective substrate in such a manner that no bonding agent is provided among the touch-control layer, the light guide layer, and the protective substrate, the manufacturing method further comprises:

disposing a first insulating layer between the protective substrate and the touch-control layer;

disposing a first touch sensing layer on the first insulating layer; and disposing a second insulating layer on the first touch sensing layer, the manufacturing method further comprises: disposing a plurality of optical re-directional structures between the second insulating layer and the light guide layer in such a manner that a space between the optical re-directional structures located on a side close to the light source is greater than that of the optical re-directional structures located on a side away from the light source, comprising:

disposing a first reflective layer on the second insulating layer, wherein the first reflective layer comprises a plurality of first reflective patterns protruded from a surface of the second insulating layer; and disposing a second reflective layer on the first reflective layer, wherein the second reflective layer comprises a plurality of second reflective patterns corresponding to the first reflective patterns, wherein the first reflective patterns and the second reflective patterns are stacked one on another and are parallel to each other, and the first reflective patterns are made of a material with a low reflectivity and the second reflective patterns are made of a material with a high reflectivity, so that a reflectivity of the first reflective layer is smaller than that of the second reflective layer.

10. The manufacturing method according to claim 9, wherein the first touch sensing layer comprises a touch sensing electrode and a touch drive electrode; and the manufacturing method further comprises: disposing a bridge metal layer on the second insulating layer, wherein the bridge metal layer is connected with the touch sensing electrode through a via hole in the second insulating layer; or the bridge metal layer is connected with the touch drive electrode through a via hole in the second insulating layer.

11. The manufacturing method according to claim 9, wherein the first touch sensing layer is a touch sensing electrode or a touch drive electrode.

12. The manufacturing method according to claim 11, further comprising: disposing a second touch sensing layer on the second insulating layer, wherein the first touch sensing layer is the touch sensing electrode, and the second touch sensing layer is the touch drive electrode; or, the first touch sensing layer is the touch drive electrode, and the second touch sensing layer is the touch sensing electrode.

\* \* \* \* \*